United States Patent Office 3,465,008
Patented Sept. 2, 1969

3,465,008
POLYMERIC PRODUCTS
Maurice Robert Mills, Sevenoaks, Kent, England, assignor to Lever Brothers Company, New York, N.Y., a corporation of Maine
No Drawing. Filed Dec. 31, 1964, Ser. No. 422,534
Claims priority, application Great Britain, Jan. 10, 1964, 1,172/64
Int. Cl. C07c *51/00, 61/16*
U.S. Cl. 260—396        8 Claims

ABSTRACT OF THE DISCLOSURE

The specification is concerned with certain polymers of an acid having the formula

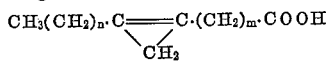

wherein $m$ and $n$ are whole numbers and $n+m$ is not greater than 14. The specification is also concerned with synthetic resins prepared from these polymers.

---

This invention relates to polymeric products and especially to polymeric products obtainable from long chain monocarboxylic acids containing a cyclopropene group and their derivatives.

Unsaturated long chain monocarboxylic acids containing a ring of three carbon atoms have been found in the glyceride structure of certain vegetable fats and have been accorded the formula:

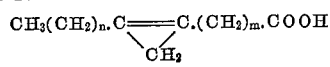

Thus, for example, sterculic acid in which $m$ and $n$ in the above formula are each equal to 7, has been found to constitute some 70% of the total combined acid in the glycerides obtained from the seeds of *Sterculia foetida* and to be present in substantial proportions in the fats from certain other members of the same and allied genera, and malvalic acid in which $m=6$ and $n=7$ has been found in very small proportions in cotton seed oil, and to the extent of about 7% in the oil from *Sterculia foetida* and about 16% in that from *Hibiscus syriacus* (which also contains about 3% of sterculic acid and about 1.5% of dihydrosterculic acid).

The so-called Halphen test (described in Nature, 1956, 178, 372) in which a red colour is developed on heating with carbon disulphide and sulphur in amyl alcohol appears to be specific to acids (whether free or combined) containing the cyclopropenoid group.

It has long been known that the oil from *Sterculia foetida* (referred to below as sterculia oil) when heated to a temperature of about 240° C. rapidly changes with strong evolution of heat into a tough rubber-like material which is insoluble in all the ordinary solvents and (as mentioned by Steger et al. in Fette und Seifen, June 1943, No. 6, pp. 305–309) can be saponified after boiling with alcoholic lye for about two days. These properties are characteristic of a rather highly cross-linked polymer.

Sterculic acid itself, obtainable by careful saponification of sterculia oil, acidification with hydrochloric acid and extraction with ether, the whole operation being carried out at a low temperature, readily undergoes polymerisation even at ordinary temperatures and rapidly at temperatures of about 100° C. The nature of this polymerisation has been investigated by Rinehart et al., J. Amer. Chem. Soc., 1961, 83, 225–231, who showed the polymerisation product to be composed of a mixture of polyesters. The polymerisation was explained as involving opening of the ring of one molecule of the acid and addition of a further molecule at the site of the rupture, this acid radical being linked to one end of the broken ring and the ionisable hydrogen atom satisfying the remaining free valency resulting from the rupture.

The mixture of polyesters was saponified to yield salts of the corresponding hydroxy acids which were identified from the periodate-permanganate oxidation products of the corresponding acetyl derivatives.

We have now obtained from esters containing combined cyclopropenoid acid, especially sterculic acid, polymeric acids having substantially higher acid values than the maximum theoretically obtainable in polyesters of the structure suggested by Rinehart et al. These novel products show the behaviour to be expected of long chain dicarboxylic acids. Thus, for example, they react with ethylene diamine to form flexible, soluble, fusible polyamides. They are unsaturated but no longer give the Halphen reaction.

Thus the invention provides a new series of substantially bi-functional polymeric acids which react with a stoichiometric proportion of ethylene diamine to form permanently fusible solid synthetic resins, said acids being polymers of an acid of the formula given above, which give no Halphen reaction and have non-conjugated olefinic unsaturation. Ideally the polymeric acids of the invention are dimers of acids of the said formula but in practice, since the polymeric acids will generally be made from natural raw materials containing a mixture of acids this ideal formula may not be realised, nor is it essential that it should be in order to obtain useful polyamides and like polycondensation polymers from the acids. On the other hand the lower the proportion of monocarboxylic acids present (for instance other fatty acids found in association with the cyclopropene acids in nature, mainly palmitic, stearic, oleic and linoleic acids) the better and it is, therefore, desirable to reduce their content to negligible proportions as will be described below. The polymeric acid material should not contain significant proportions of acids with a functionality greater than two since this leads to undesired cross linkage of the synthetic resin.

According to the process of the invention substantially bi-functional polymeric acids of the kind referred to are made by thermally polymerising a hydrolysable derivative of a cyclopropene fatty acid, said derivative containing only a single cyclopropene group per molecule, in the substantial absence of derivatives containing more than one such group, until the Halphen reaction is no longer obtained, after which the resulting polymer is hydrolysed and the polymeric acid liberated. The hydrolysis may be effected by saponification preferably with caustic soda and the polymeric acid may then be liberated from the soap thereof by the action of acid. By this method substantially complete hydrolysis is readily effected. An alternative method that is somewhat less efficient but in other ways commercially preferable is to split the polymerised derivative by treatment with hot water in the presence of steam under pressure, so obtaining the polymeric acid directly. This method commonly does not give 100% hydrolysis in a single run and if employed should preferably be repeated with fresh water until substantially complete splitting has resulted.

When the cyclopropene acid derivative is present in the raw material together with other fatty acids, these acids (which remain unchanged during the polymerisation) should be separated from the polymeric acid. This can be done in various ways, of which distilling off the unchanged acid under reduced pressure has been found to be preferable on the large scale. In small scale separations, removal of the unchanged acid in the form of urea adducts has also proved successful although by this method a somewhat less quantative separation has resulted.

In carrying out the polymerisation of the acid derivatives a temperature of about 250° C. is preferred. At lower temperatures the reaction is slower. To obtain a reasonable rate of reaction the temperature of polymerisation should be at least 200° C. At 250° C. polymerisation is rapid and there would be no point in attempting to carry out this reaction at substantially higher temperatures. The reaction is exothermic and adequate arrangements must, therefore, be made for dissipating the heat of reaction, but when the proportion of cyclopropene acid in the material treated is not unduly high (as it is, for example, in fats such as sterculic oil) heat dissipation presents little difficulty.

Preferably the polymeric acids of the invention are obtained by heating triglycerides containing a single sterculic acid group (especially such triglycerides in which the other combined acids present are saturated or mono-olefinically unsaturated fatty acids) to effect polymerisation, saponifying the polymerisation product, acidifying to liberate the free acids, which include polymeric acids resulting from interaction between two sterculic acid residues in different glyceride molecules, and separating the polymeric acids from the other acids present in the mixture by removing those other acids, for instance by distillation or urea adduction.

It is not necessary for the starting product to be composed solely of monosterculic acid triglycerides. Fats containing such glycerides may form the starting material provided that the fats do not contain undue proportions of glycerides containing more than one cyclopropenoid acid residue. The presence of large proportions of glycerides having two or three cyclopropenoid acid residues in the molecule (as in sterculia oil, which may contain over 12% of glycerides containing three, and over 40% of glycerides containing two sterculic acid residues) leads to cross linked polymers such as that described by Steger et al., the saponification of which presents great difficulty and requires protracted treatment under vigorous conditions making it difficult to avoid undesired further reaction.

Although the invention is of particular importance in preparing polymeric acids from materials containing sterculic acid, materials containing other long chain cyclopropane monocarboxylic acids, for instance malvalic and bombacis acids, can be treated in the same way.

With a view to avoiding the formation of intractable cross-linked polymers prior to the saponification step, it is desirable to avoid the use of starting materials containing more than about 25 molar percent of glycerides with more than one cyclopropene acid radical in the molecule. For this reason, when using whole natural fats as the starting material, it is advantageous to select those in which the cyclopropenoid acids do not constitute more than about 35% (and preferably even less, for instance 10–20, 25 or 30%) of the total acid.

The invention includes preparing from fats containing combined cyclopropene acids glyceride mixtures containing, compared with the initial fat, a lower or negligible proportion of triglycerides containing more than one cyclopropenoid acid radical per molecule. The proportion of glycerides containing more than one cyclopropenoid radical per molecule may be reduced for instance by interesterification with mono-, di- or triglycerides which are free from such acids, with glycerol or with polyhydric alcohols, and from the reaction mixture fractions relatively rich in triglycerides containing a single cyclopropenoid radical and poor in triglycerides containing more than one such radical can be recovered, for instance by solvent fractionation.

It is not essential to employ the cyclopropenoid acid in the form of glycerides and the invention includes the use, in forming the polymeric acids, of other derivatives of the cyclopropenoid acid, in which the ionisable hydrogen of the acid has been replaced by a group or atom that is inert during the polymerisation step but can readily be split off thereafter, for instance by hydrolysis so as to enable the desired polymeric acid to be obtained. The invention includes, for instance, saponifying an oil containing cyclopropenoid acid, heating the soaps to effect polymerisation, splitting the reaction mixture with acid and recovering the polymeric acid liberated.

The invention includes polymeric acids such as are obtainable by the methods described, from materials containing long chain cyclopropenoid monocarboxylic acids as well as the preparation of such polymeric acids.

As indicated above, the polymeric acids are preferably prepared from a fat containing cyclopropenoid acids in suitable proportions by subjecting the fat to polymerisation, liberating the polymeric acids from the polymerisation product, and at some stage in the process separating the polymeric acids from the other fatty acids, for instance by distilling off these fatty acids under very low pressure from the mixture obtained by acidifying the saponification product. The invention includes effecting this separation by other methods such as are known in the art for effecting similar separations.

When the cyclopropene acid is sterculic we have obtained polymeric acids in which the acid value is between 130 and 170, the saponification value between 165 and 180 and the iodine value between 75 and 95. Corresponding constants for products formed from other cyclopropene acids, e.g., malvalic acid, can easily be calculated.

The polymeric acids of the invention are valuable intermediates for the production of a variety of useful chemical products. Surface active properties are exhibited by the polymeric acids and their water soluble salts and by derivatives in which the carboxyl groups are replaced by other hydrophilic groups. The invention includes esterifying the polymeric acids with monohydric alcohols whether of low, medium or high molecular weight, for instance with a view to preparing plasticisers and lubricant additives.

The polymeric acids are of particular value in the synthetic resin and coating industries where there is a great demand for long chain dicarboxylic acids for use in polycondensation reactions such as the preparation of polyester resins and polyamides. The preparation of polyamides by reaction of the polymeric acids of the invention with ethylene diamine has been described above. The polymeric acids may also be used in forming linear polyesters by condensation with glycols and in forming cross-linked resins by condensation with polyhydric alcohols. Compared with the long chain unsaturated acids that are available from other sources, for instance by polymerising long chain monocarboxylic acids having double bonds, the polymeric acids of the invention have considerable advantage. They can be obtained in high yield from fats containing suitable proportions of cyclopropenoid acids by methods which do not involve subjection to temperatures leading to decomposition and in a form in which they are substantially free from other fatty acids and especially from acids containing more than two carboxyl groups per molecule which, if present, would lead to undesired cross-linking.

The chemical constitution of the polymeric acids has not yet been finally established but the mode of production and the properties of these acids are consistent with a formula in which two $CH_3(CH_2)_n-$ groups and two $HOCO(CH_2)_m-$ groups are attached to a dihydro benzene ring as in

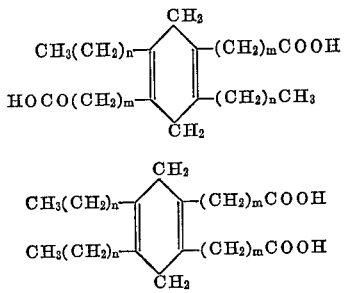

$n$ being equal to 7 and $m$ being equal to 7 when the products are derived from sterculic acid and 6 when they are derived from malvalic acid.

Examples 1 to 8 below illustrate the invention.

Example 1

An oil was extracted from the seeds of *Bombax oleagineum*. This oil was of iodine value 50.4 and gave a strong Halphen reaction. The percentage composition of the total acids was estimated to be as follows:

| | |
|---|---|
| Palmitic acid | 53 |
| Stearic acid | 3 |
| Oleic acid | 5 |
| Linoleic acid | 7 |
| Linolenic acid | — |
| Cyclopropenoid acid | 32 |

The proportion of cyclopropenoid acid was estimated by hydrobromic acid titration according to the Durbetaki method (Anal. Chem., 1956, 28, 200). By gas-liquid-chromatographic analysis of the mixed methyl esters of the fully hydrogenated oil as described by Cornelius and Shone, Chemistry and Industry, 1963, 1246, the cyclopropenoid acid was found to be composed for the most part of sterculic acid.

The oil was heated in a kettle under an atmosphere of carbon dioxide for 15 minutes at 250° C. and allowed to cool. The changes occurring during this treatment will be clear from the following table.

| | Before heating | After heating |
|---|---|---|
| Iodine value | 50.4 | 51.0 |
| Refractive index (25° C.) | 1.4633 | 1.4696 |
| Viscosity, c.p.s. (25° C.) | 99 | 370 |
| Halphen reaction | Strong | Absent |

The treatment was sufficient to polymerise the cyclopropenoid acids without changing any other unsaturated acids present. The large increase in viscosity indicates that polymerisation has occurred.

The polymerised oil was completely saponified by heating with a 50% excess of 3 N aqueous caustic soda at 80–90° C., until samples tested by splitting with acid and titrating the free fatty acids showed the reaction to be complete, which occurred in 30–45 minutes. The fatty acids were liberated by adding a slight excess of sulphuric acid. The fatty layer was separated and washed repeatedly with hot water until free from mineral acid, and dried. The product had an acid value of 197.

400 parts by weight of the fatty acids were placed in a pot still and distilled under a pressure of 2–3 mm. at 240° C., using a steam sparge. 263 parts by weight of monomeric fatty acids distilled off, leaving a residue of 132 parts of polymer.

The distillate was shown by gas-liquid-chromatography to contain 80% of palmitic acid with minor amounts of other saturated acids (4% in all) and some oleic and linoleic acids. The residue consisted of a light yellow viscous oil having an acid value of 160.

Example 2

The polymeric acid obtained as the residue in Example 1 was heated in a proportion of 130 parts by weight with 16 parts of ethylene diamine with stirring in an atmosphere of nitrogen at 130 to 140° C. for two hours. The temperature was then slowly raised over a period of two hours to 205° C.

The product was a clear amber coloured polyamide resin soluble in alcohol-hydrocarbon mixtures. It was compatible with medium oil alkyd resins on gentle warming at temperatures below 100° C. and compositions so made set to thixotropic gels on cooling.

Example 3

An oil was expressed from the seeds of *Bombax munguba* and analysis gave the following figures:

| | | |
|---|---|---|
| Iodine value | | 49.7 |
| Palmitic acid | percent | 56 |
| Stearic acid | do | 3 |
| Oleic acid | do | 6 |
| Linoleic acid | do | 13 |
| Linolenic acid | | — |
| Cyclopropenoid acid | percent | 22 |

A polymeric acid was obtained from this oil by the method described in Example 1.

A polyamide resin was obtained from the polymeric acid as described in Example 2.

Example 4

An oil was expressed from the seeds of *Pachira aquatica* and analysis gave the following figures:

| | | |
|---|---|---|
| Iodine value | | 44.5 |
| Palmitic acid | percent | 57 |
| Stearic acid | do | 3 |
| Oleic acid | do | 7.5 |
| Linoleic acid | do | 5 |
| Linolenic acid | do | 1 |
| Cyclopropenoid | do | 26.5 |

A polymeric acid was obtained from this oil by the method described in Example 1, the yield being 30% based on weight of acid taken.

A polyamide resin was obtained from the polymeric acid as described in Example 2.

The product was a pale amber resin with an acid value of 5.4 and an amine value of 30.8. This resin melted sharply at 86.8° C. when tested by the ring and ball method.

Example 5

An oil was expressed from the seeds of *Pachira insignis* and analysis gave the following results:

| | | |
|---|---|---|
| Iodine value | | 40.9 |
| Palmitic acid | percent | 62 |
| Stearic acid | do | 2 |
| Oleic acid | do | 2 |
| Linoleic acid | do | 7 |
| Linolenic acid | | — |
| Cyclopropenoid acid | percent | 24 |

A polymeric acid was obtained from this oil by the method described in Example 1.

A polyamide resin was obtained from the polymeric acid as described in Example 2, except that 26 parts of ethylene diamine were reacted with 130 parts of acid. The product was a pale amber thermoplastic resin with an acid value of 0.5, an amine value of 171, which melted sharply at 41.2° C. when tested by the ring and ball method.

Example 6

An oil of the composition specified in Example 1 was polymerised as described in that example. The polymerised oil was then hydrolysed by treatment with an equal volume of water in an autoclave under a pressure of 450 lbs. per square inch for one hour. The aqueous phase was then separated, replaced by water and the treatment was repeated. The fatty acids were recovered from the aqueous phase. The mixture of acids so obtained had an acid value of 195.

From the acid mixture the monomeric acids were distilled off as described in Example 1. The residue was substantially identical with that obtained in Example 1.

Example 7

The process was carried out as in Example 6 except that instead of distilling the monomeric acids from the mixture of acids resulting from the splitting, the separation was effected by urea adduction. 1 part by weight of fatty acids was dissolved in 16 parts of benzene and 1 part of methanol at a temperature of 40° C. The solution was cooled to room temperature and 7 parts by weight of finely divided urea added slowly with stirring. After standing overnight the solid adduct was recovered by filtration and decomposed with warm water. The liberated fatty acids recovered in this way, amounting to 60% of the total acid treated, consisted mainly of palmitic acid (saponification value 212, iodine value 15.5).

The polymerised acids required were recovered from the filtrate in a yield of approximately 40% based on the total acid treated, by distilling off the solvent. This product was a light, viscous oil of acid value 152 and iodine value 90.5.

Example 8

The oil treated was of the composition specified in Example 4. The oil was saponified by heating a mixture of the following composition:

100 parts of the oil.
100 parts of glycerol.
18 parts of sodium hydroxide (dissolved in the minimum proportion of water).

The mixture was gently heated at 110° C. until all the water had been expelled (in the course of 30 minutes) after which the temperature was raised to 250° C. and held there for 20 minutes. The material then gave a negative Halphen reaction. The acids were recovered from the soap by acidification with dilute hydrochloric acid in the usual way.

The mixture of acid so obtained was fractionated with urea as described in Example 7 to give 63% of a solid fraction (saponification value 211.7) composed of monomeric acids mainly palmitic and 37% of viscous oil having an acid value of 130 and a saponification value of 170.

Satisfactory polyamide resins were prepared from this acid as described in Example 2.

The following example shows, by contrast with the preceding examples the different results are obtained when the cyclopropene acids liberated from the unpolymerised oil are polymerised.

Example 9

An oil of the composition specified in Example 4 was saponified with caustic soda and fatty acids liberated by the cautious addition of hydrochloric acid, care being taken to avoid any large excess being present at any time. The product had an acid value of 201.6 and a saponification value of 209.8. After stirring at 250° C. for 20 minutes the Halphen reaction became negative and the acid value was then 164 and the saponification value 207.8.

From the mixture of acids so obtained monomeric acid was removed by distillation under reduced pressure under the conditions specified in Example 1.

The residue, a dark viscous oil, was obtained in a yield of 20%.

When treated with ethylene diamine as described in Example 2 a soft black sticky resin was obtained having an acid value of 8.7 and an amine value of 46.4. The soft sticky nature of this product is evidence that the polymerised acid behaves for the most part as a monofunctional monomer in the resin formation. The product was regarded as commercially valueless.

The following example shows the impracticability of attempting to use as the starting material for the products of the invention fats containing high proportions of cyclopropene acid.

Example 10

The starting material used was oil expressed from the fruit of Sterculia foetida and contained, therefore, oil from both fruit coat and seed. When analysed by the Durbetaki method it was shown to contain 60% of cyclopropene acids calculated as sterculic. Some 34% of the oil consisted of saturated fatty acid (mainly palmitic) and substantially all the remainder of linoleic and oleic.

The oil had the following characteristics:

Iodine value _____ 83.2
Saponification value _____ 186.8
$n_{40}^D$ _____ 1.4646

20 grams of the oil contained in a boiling tube was immersed in an oil bath at 250° C. for 15 minutes. The oil set to an insoluble gel while still giving positive reaction to the Halphen test. All attempts to avoid this gel formation, by very careful control of temperature, failed and when larger proportions of the oil were treated it proved impossible to control the temperature rise. These trials were regarded as showing it to be impracticable to obtain from this oil by direct polymerisation followed by saponification, polymerised acids useful in resin formation.

What is claimed is:

1. A substantially bi-functional polymeric acid having the formula

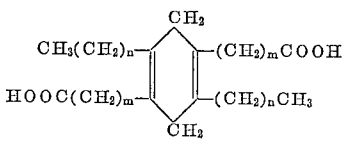

or

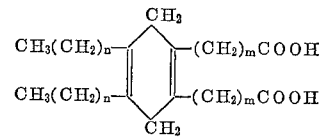

wherein $m$ and $n$ are whole numbers, $n+m$ being not greater than 14, giving no Halphen reaction and having non-conjugated olefinic unsaturation.

2. A polymer according to claim 1, wherein the acid $m$ is 6 or 7 and $n$ is 7.

3. A process for preparing a substantially bi-functional polymeric acid wherein an ester of an acid of the formula

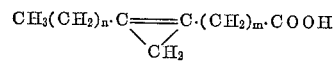

wherein $m$ and $n$ are whole numbers, $n+m$ being not greater than 14, said ester containing only a single cyclopropene group per molecule, is subjected to thermal polymerisation at a temperature of at least 200° C. until it no longer gives a Halphen reaction and the resulting polymer is hydrolysed and the polymeric acid liberated.

4. Process according to claim 3, wherein the hydrolysis and liberation of a polymeric acid are effected by alkaline saponification of the polymerised derivative followed by acidification of the resulting salt of the polymeric acid.

5. Process according to claim 3, wherein the ester is a fatty acid glyceride containing a single cyclopropene group.

6. Process according to claim 5, wherein the glyceride is a fatty acid tri-glyceride.

7. Process according to claim 6, wherein the ester is contained in a fat which is substantially free from glycerides containing more than one cyclopropene acid radical in the molecule.

8. Process according to claim 7, wherein after liberation of the polymeric acid that acid is freed from fatty acids not containing a cyclopropene derivative by distilling off the last mentioned acids.

References Cited

J.A.C.S. by Rinehart et al. (1961), pp. 225 to 231 relied on.

LORRAINE A. WEINBERGER, Primary Examiner

L. A. THAXTON, Assistant Examiner

U.S. Cl. X.R.

260—78.4, 407

PO-1050
(5/69)

UNITED STATES PATENT OFFICE
CERTIFICATE OF CORRECTION

Patent No. 3,465,008          Dated September 2, 1969

Inventor(s) Maurice Robert Mills

It is certified that error appears in the above-identified patent and that said Letters Patent are hereby corrected as shown below:

Column 1, line 59, after "can" insert --only--; Column 3, line 15, "tives" should be --tive--; Column 3, line 58, "bombacis" should be --bombacic--; Column 4, line 8, "essentional" should be --essential--; Column 6, line 56, "2%" should be --5%--.

SIGNED AND
SEALED
JAN 20 1970

(SEAL)
Attest:

Edward M. Fletcher, Jr.
Attesting Officer

WILLIAM E. SCHUYLER, JR.
Commissioner of Patents